W. J. BAIRD.
MOLDING MACHINE.
APPLICATION FILED APR. 9, 1920.
1,379,328.
Patented May 24, 1921.
3 SHEETS—SHEET 3.
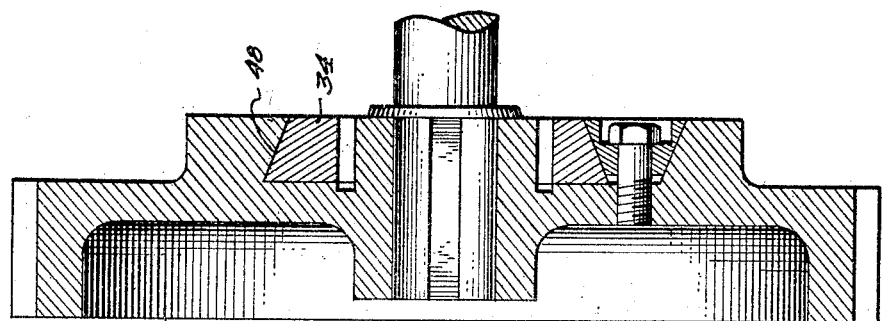
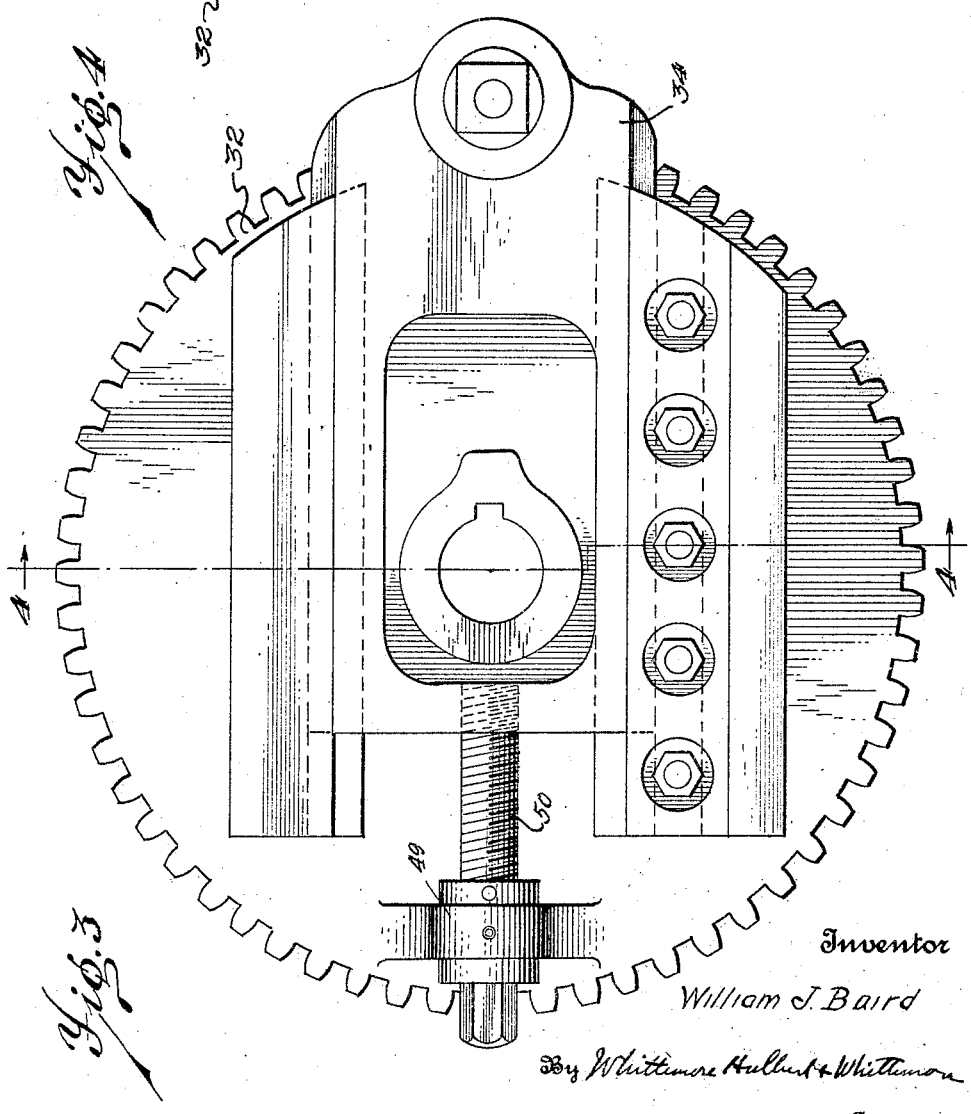
Inventor
William J. Baird
By Whittemore Hulbert & Whittemore
Attorney

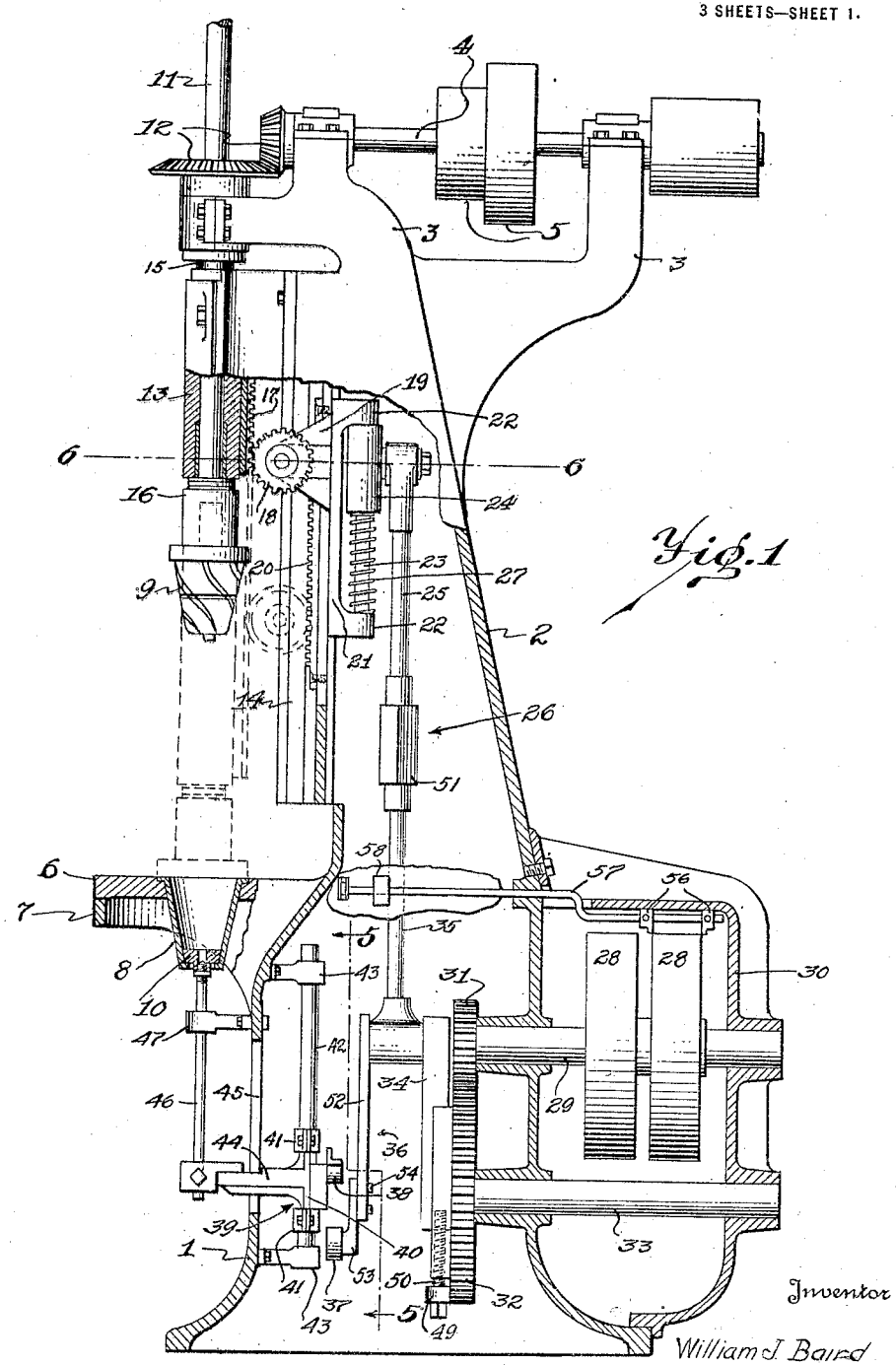

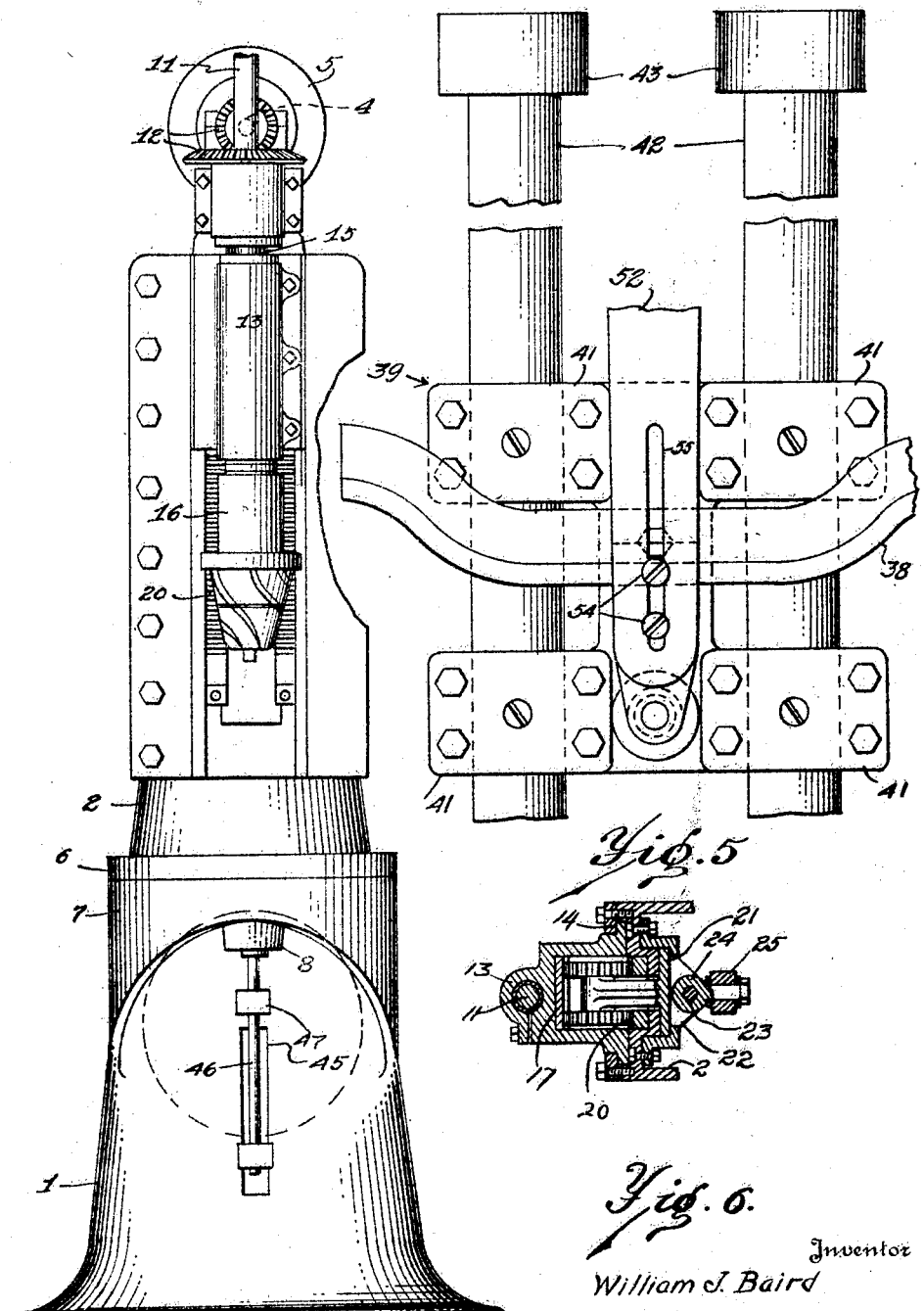

UNITED STATES PATENT OFFICE.

WILLIAM J. BAIRD, OF DETROIT, MICHIGAN.

MOLDING-MACHINE.

1,379,328.  Specification of Letters Patent.  Patented May 24, 1921.

Application filed April 9, 1920. Serial No. 372,732.

*To all whom it may concern:*

Be it known that I, WILLIAM J. BAIRD, a citizen of the United States of America, residing at Detroit, in the county of Wayne and State of Michigan, have invented certain new and useful Improvements in Molding-Machines, of which the following is a specification, reference being had therein to the accompanying drawings.

The invention relates to molding machines and refers particularly to machines for forming articles from plastic material. The invention has for one of its objects to provide a machine having relatively few parts and of great simplicity. Other objects of the invention reside in the novel arrangements and combination of parts as more fully hereinafter set forth.

In the drawings:

Figure 1 is a vertical central section, partly in elevation, of a machine embodying my invention;

Fig. 2 is a front elevation thereof;

Fig. 3 is a side elevation of the crank gear and crank pin slide in engagement therewith;

Fig. 4 is a central cross section therethrough;

Figs. 5 and 6 are cross sections on the lines 5—5 and 6—6 respectively of Fig. 1.

The frame of the molding machine comprises the hollow base 1 and the hollow column 2 extending upwardly therefrom and having the furcations 3 at its upper end in which a suitable driving shaft 4 is journaled, the driving pulleys 5 being secured on this shaft.

6 is a table upon the frame and preferably supported upon the curved projection 7 extending integrally from the upper end of the hollow base 1. 8 is a suitable mold supported upon the table 6, and 9 and 10 are respectively a former and an ejector movable longitudinally within the mold for respectively forming the articles in the mold and ejecting the articles after they are formed. The former 9 is removably secured upon the shaft 11, which is journaled in one of the furcations 3 and rotated by the coöperating bevel gears 12 respectively upon the shafts 11 and 4, the arrangement permitting of longitudinal sliding movement of the shaft 11 relative to its respective gear.

For longitudinally moving the former 9 within the mold 8, the sleeve 13 is provided rotatably secured to and surrounding the shaft 11. This sleeve longitudinally slidably engages in the guide way 14 at the front of the hollow column 2 of the frame. The collar 15 and collet 16 suitably secured to the shaft 11 engage the upper and lower ends of the sleeve 13, thereby securing the same to the shaft. There is a rack 17 mounted upon the sleeve 13 and extending longitudinally thereof, the teeth of which are engaged by the teeth of a pair of gears 18 rotatably mounted upon the support 19 and also meshing with the parallel racks 20 upon the hollow column 2 of the frame. 21 is a carrier for the support 19 slidably engaging in a suitable guide-way extending longitudinally of the hollow column 2. This carrier has the inwardly extending ends 22, which are connected by the rod 23. 24 is an actuating member sleeved about the rod 23 and pivotally connected to the upper portion 25 of the connecting rod 26. For yieldably moving the carrier 21 in a downward direction, the coil spring 27 is provided surrounding the rod 23 and located between the lower end of the actuating member 24 and the lower inwardly extending end 22 of the carrier.

It will be readily seen that with the above arrangement of reciprocating mechanism the former has twice the amount of movement of the support for the gears and its carrier, so that the height of the frame of the machine can be greatly reduced and the necessary amount of movement of the former can at the same time be secured.

For longitudinally moving the ejector 10 the following construction is provided: 28 are a pair of pulleys, one of which is an idler and the other a driving pulley and 29 is a shaft upon which these pulleys are mounted. This shaft is in turn mounted in the hollow base 1 and the out-board bearing cap 30, which encloses both of the pulleys 28. 31 is a pinion secured upon the inner end of the shaft 29 and 32 is a crank-gear meshing with the pinion 31 and mounted upon the shaft 33 which in turn is mounted in the hollow base 1 and out-board bearing cap 30. 34 is a crank pin slide mounted upon the crank gear and rotatably connected to the lower portion 35 of the connecting rod 26. 36 is a crank arm nonrotatably secured to the crank pin slide 34 and having mounted at its free end the roller 37 which moves in the path of the cam 38 which is fixedly secured to the cross head or slide 39. This cross head or slide has the main body portion 40 and the laterally extending bearings 41 at its opposite ends, which bearings slidably engage the rods 42 mounted in the brackets 43 upon the hollow base 1. The cross head or slide also has the laterally extending arm 44, which extends through a vertical slot 45 in the front wall of the hollow base 1 and is suitably connected to and supports the ejector rod 46. 47 is a suitable guide secured to the hollow base 1 and surrounding the ejector rod 46 near its upper end.

For the purpose of varying the amount of movement of the former 9 and ejector 10 the crank pin slide 34 is slidably mounted in the undercut groove 48 which extends diametrically of the crank gear 32. 49 is a suitable lug upon the crank gear 32, which is engaged by the rod 50 threadedly engaging the crank pin slide 34 for moving the latter across the face of the crank gear to thereby vary the position of the crank pin relative to the axis of the crank gear. 51 is a union connecting the upper and lower portions of the connecting rod to permit of the radial adjustment of the crank pin slide upon the crank gear. The crank arm 36 upon which the roller 37 is rotatably mounted, is also adjustable and as shown comprises the parts 52 and 53 secured to each other by means of cap bolts 54, which cap bolts extend through slot 55 in the part 52 of the crank rod.

56 are suitable fingers for engaging the opposite edges of a driving belt and 57 is a belt shifting rod longitudinally slidably mounted in bearings 58 at the upper end of the hollow base 1 and carrying the fingers 56, the arrangement being such that the belt may be readily shifted from the one pulley to the other.

In operation a sufficient amount of plastic material is placed in a mold and a former is then moved toward the mold while at the same time it is being rotated, the spring tension of the reciprocating means accommodating the motion of the plunger to the resistance of the plastic material on the downward stroke and the mechanism positively returning it to initial position. While the form is being retracted from the mold the ejector raises the molded mass and ejects it from the mold in timed relation to the movement of the former.

What I claim as my invention is:

1. In a molding machine, the combination with a frame, of a mold mounted on said frame, a former longitudinally movable within said mold, a rack connected to said former, a second rack upon said frame, a gear meshing with said racks, and means for relatively moving said gear and second rack to thereby longitudinally move said first mentioned rack.

2. In a molding machine, the combination with a frame, of a mold mounted on said frame, a former longitudinally movable within said mold, a longitudinally movable rack connected to said former, a second rack fixedly secured to said frame, a gear meshing with said racks, and means for moving said gear over said second rack to thereby longitudinally move said first mentioned rack.

3. In a molding machine, the combination with a frame having a hollow column, of a mold mounted on said frame, a former longitudinally movable within said mold, a longitudinally movable rack connected to said former, a second rack upon said hollow column, a gear meshing with said racks, and means within said column for relatively moving said gear and second rack to thereby longitudinally move said first mentioned rack.

4. In a molding machine, the combination with a frame having a hollow base and a hollow column, of a mold mounted on said frame, a former longitudinally movable within said mold, a longitudinally movable rack connected to said former, a second rack fixedly secured upon said hollow column, a gear meshing with said racks, means within said hollow column for moving said gear over said second rack to thereby longitudinally move said first mentioned rack, and means within said hollow base for actuating said means within said hollow column.

5. In a molding machine, the combination with a frame having a hollow base, of a mold mounted on said frame, a former and an ejector longitudinally movable within said mold, driving mechanism within said hollow base and connections between said driving mechanism and former and ejector for actuating said former and ejector adapted to yieldingly force the former toward the mold.

6. In a molding machine, the combination with a frame, having a hollow base, a hollow column, and a table upon said base, of a mold supported on said table, a former and an ejector movable longitudinally within said mold, means within said hollow column for reciprocating said former adapted to yieldingly force the former toward the mold, and means within said hollow base for reciprocating said ejector and for actuating said former reciprocating means.

7. In a molding machine, the combination with a frame having a hollow base, of a mold supported upon said frame, a former and an ejector longitudinally slidable within said mold, and means for reciprocating said former and ejector, comprising a pulley wheel rotatably mounted in said hollow base, a crank gear rotatably mounted within said base and driven from said pulley wheel, a crank pin slide radially adjustably secured to said crank gear, a crank arm upon said crank pin slide, a roller upon said crank arm and a reciprocable member connected to said ejector and adapted to be engaged by said roller upon rotation of said crank arm.

8. In a molding machine, the combination with a frame having a base, of a mold supported upon said frame, an ejector longitudinally slidable within said mold, a pulley wheel rotatably mounted on said base, a crank gear rotatable from said pulley wheel, a crank pin slide radially adjustably secured to said crank gear, a crank arm upon said crank pin slide, a reciprocable member slidably mounted on said base and connected to said ejector, and means for actuating said reciprocable member from said crank arm.

9. In a molding machine, the combination with a frame of a mold mounted thereon, a former longitudinally movable within the mold, a rack connected to the former, a rack secured upon the frame, a gear meshing with both racks and means for relatively moving said gear and second rack to thereby longitudinally move said first-mentioned rack, adapted to yieldingly force the gear and second rack toward the mold.

In testimony whereof I affix my signature.

WILLIAM J. BAIRD.